(12) United States Patent
Notsu (10) Patent No.: US 11,169,814 B2
(45) Date of Patent: Nov. 9, 2021

(54) INFORMATION PROCESSING METHOD AND COMPUTER-READABLE RECORDING MEDIUM HAVING STORED THEREIN OPTIMIZATION PROGRAM

(71) Applicant: FUJITSU LIMITED, Kawasaki (JP)

(72) Inventor: Takahiro Notsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/009,833

(22) Filed: Sep. 2, 2020

(65) Prior Publication Data
US 2021/0081210 A1   Mar. 18, 2021

(30) Foreign Application Priority Data

Sep. 17, 2019   (JP) .............................. JP2019-168077

(51) Int. Cl.
*G06F 9/44* (2018.01)
*G06F 9/38* (2018.01)
*G06F 8/41* (2018.01)

(52) U.S. Cl.
CPC ............ *G06F 9/3887* (2013.01); *G06F 8/445* (2013.01); *G06F 8/4441* (2013.01); *G06F 8/45* (2013.01); *G06F 8/456* (2013.01); *G06F 9/3861* (2013.01)

(58) Field of Classification Search
None
See application file for complete search history.

(56) References Cited

U.S. PATENT DOCUMENTS

| | | | | |
|---|---|---|---|---|
| 10,802,567 | B2 * | 10/2020 | Bonen | G06F 9/3869 |
| 2009/0276766 | A1 * | 11/2009 | Song | G06F 8/456 |
| | | | | 717/159 |
| 2010/0274972 | A1 * | 10/2010 | Babayan | G06F 9/3838 |
| | | | | 711/125 |
| 2016/0048380 | A1 * | 2/2016 | Nakashima | G06F 8/4452 |
| | | | | 717/160 |

(Continued)

FOREIGN PATENT DOCUMENTS

JP   2016-40691 A   3/2016

OTHER PUBLICATIONS

Extended European Search Report dated Feb. 9, 2021 for corresponding European Patent Application No. 20194305.7, 10 pages.

(Continued)

*Primary Examiner* — Qamrun Nahar
(74) *Attorney, Agent, or Firm* — Fujitsu Patent Center (57) ABSTRACT

An information processing method executed by a computer, the method includes executing a target program to acquire number of executions for each of a plurality of program codes; selecting a combination of program codes related to a plurality of assignment statements from among program codes related to assignment statements having a higher number of executions based on the acquired number of executions; when the target program is changed, executing the changed target program to calculate an execution accuracy and an operation time so that parallel processing using an SIMD operation function is executed for each of the program codes related to the plurality of assignment statements included in the selected combination; and searching for the combination so that the calculated execution accuracy and operation time satisfy a predetermined condition.

10 Claims, 10 Drawing Sheets

(56) References Cited

U.S. PATENT DOCUMENTS

2019/0012155 A1* 1/2019 Oey .................. G06F 8/60

OTHER PUBLICATIONS

Xu, Shixiong et al., "Bitslice Vectors: A Software Approach to Customizable Data Precision on Processors with SIMD Extensions", 2017 46th International Conference on Parallel Processing (ICPP), IEEE, XP033148500, [retrieved on Sep. 1, 2017], pp. 442-451, Aug. 14, 2017.

Hong, Ding-Yong et al., "HQEMU: A Multi-Threaded and Retargetable Dynamic Binary Translator on Multicores", Proceedings of the Tenth International Symposium on Code Generation and Optimization, CGO '12, XP055444592, New York, New York, USA, pp. 104-113, Jan. 1, 2012.

* cited by examiner

```
code.c:106:5154604:   eigen_func->Ar1[i][0] = (Ar2[i − 1][0] * Ar1[i − 1][0]}
code.c:130:2619152:   for (int i = 1; i < M; i++)
code.c:132:2508227:   k[0] = sqrt(fabs(n0[i] * n0[i] − n * n)) * k0;
code.c:101:2508227:   for (int i = 2; i < M; i++)
code.c:136:1650425:   Ar1[i][0][0] = exp(k[i] * (x[i] − y[0]));
code.c:137:1650425:   Ar1[i][0][1] = 1.0 / Ar1[i][0][0];
code.c:138:1650425:   Ar1[i][1][0] = k[i] * Ar1[i][0][0];
code.c:139:1650425:   Ar1[i][1][1] = −k[i] * Ar1[i][0][0];
```

605
601
602
604
603

PROGRAM CODE RELATED TO ASSIGNMENT STATEMENT HAVING HIGHER NUMBER OF EXECUTIONS

INFORMATION PROCESSING METHOD AND COMPUTER-READABLE RECORDING MEDIUM HAVING STORED THEREIN OPTIMIZATION PROGRAM

CROSS-REFERENCE TO RELATED APPLICATION

This application is based upon and claims the benefit of priority of the prior Japanese Patent Application No. 2019-168077, filed on Sep. 17, 2019, the entire contents of which are incorporated herein by reference.

FIELD

The embodiments discussed herein are related to an information processing method and a computer-readable recording medium having stored therein an optimization program.

BACKGROUND

In the related art, parallel processing using a single instruction multiple data (SIMD) operation function is known as one optimization technique for optimizing a program. According to the optimization technique, an operation time may be reduced by reducing an execution accuracy of the program.

Example of the related art includes Japanese Laid-open Patent Publication No. 2016-40691.

SUMMARY

According to an aspect of the embodiments, an information processing method executed by a computer, the method includes executing a target program to acquire number of executions for each of a plurality of program codes; selecting a combination of program codes related to a plurality of assignment statements from among program codes related to assignment statements having a higher number of executions based on the acquired number of executions; when the target program is changed, executing the changed target program to calculate an execution accuracy and an operation time so that parallel processing using an SIMD operation function is executed for each of the program codes related to the plurality of assignment statements included in the selected combination; and searching for the combination so that the calculated execution accuracy and operation time satisfy a predetermined condition.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in a case of the above-described optimization technique, a sufficient effect may not be obtained in a reduction in the operation time unless a target of which an execution accuracy is to be reduced is appropriately selected.

An object of one aspect of the embodiment is to appropriately select a target of which an execution accuracy is to be reduced in parallel processing using an SIMD operation function.

Hereinafter, the embodiment will be described with reference to the accompanying drawings. In the present specification and the drawings, components having substantially the same functional configurations are given to the same reference numerals, and duplicated description is omitted.

First Embodiment

<Hardware Configuration of Information Processing Apparatus>

First, a hardware configuration of an information processing apparatus that optimizes a target program by executing an optimization program will be described. In the first embodiment, the term "optimization" refers to a realization of a reduction in an operation time in parallel processing using an SIMD operation function by appropriately selecting a program code of which an execution accuracy is to be reduced in a target program.

Figure 1:
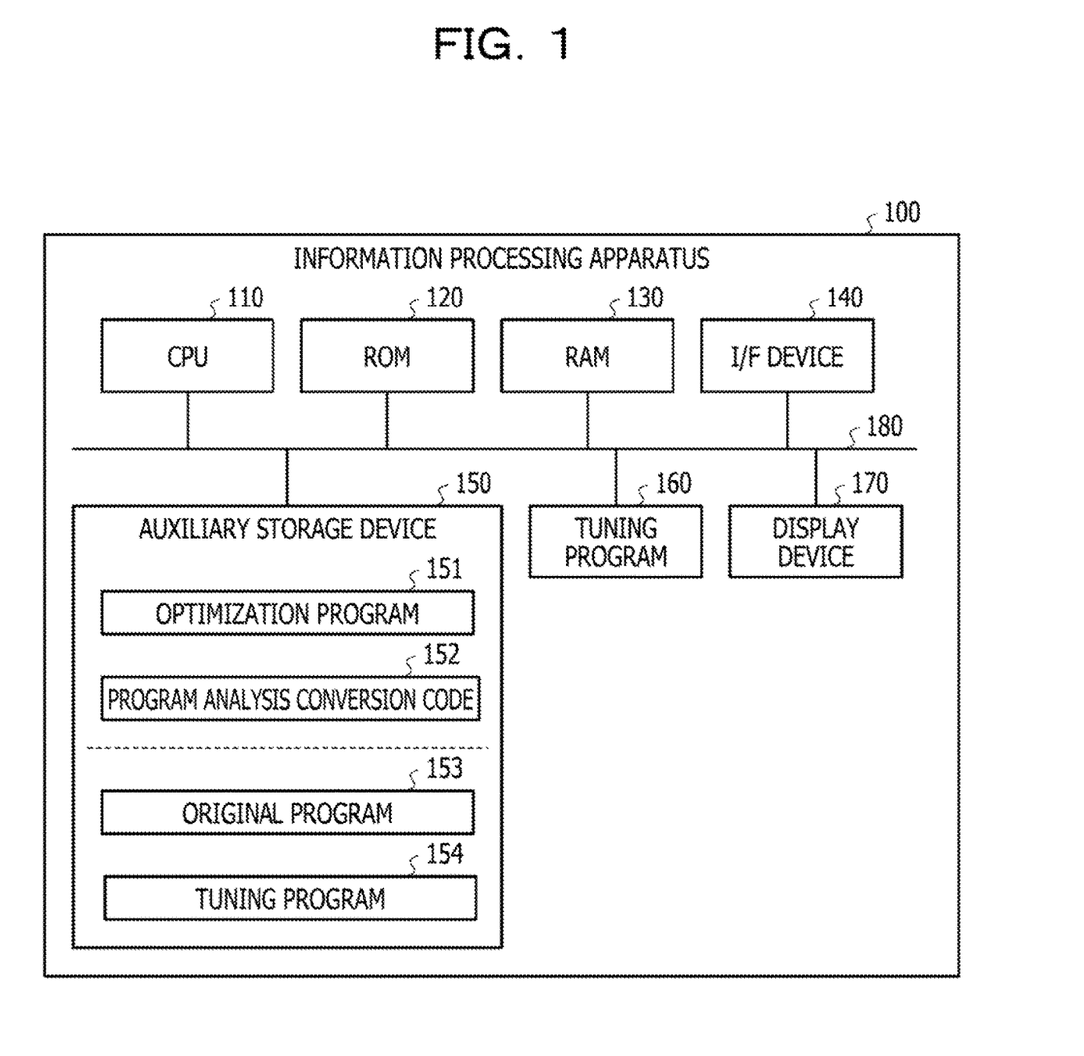
FIG. 1 is a diagram illustrating an example of a hardware configuration of an information processing apparatus.

FIG. 1 is a diagram illustrating an example of a hardware configuration of an information processing apparatus. As illustrated in FIG. 1, an information processing apparatus 100 includes a central processing unit (CPU) 110, a read-only memory (RUM) 120, and a random-access memory (RAM) 130. The CPU 110, ROM 120, and RAM 130 form a so-called computer.

The information processing apparatus 100 includes an interface (I/F) device 140, an auxiliary storage device 150, an operation device 160, and a display device 170. Each hardware of the information processing apparatus 100 is coupled to each other via a bus 180.

The CPU 110 is an operation device that executes various programs (for example, an optimization program, an original program (target program to be optimized), and a tuning program (optimized program)) installed in the auxiliary storage device 150. The CPU 110 has an SIMD operation function and executes a part of program codes (program codes appropriately selected in the original program and converted) included in the tuning program by parallel processing.

The ROM 120 is a non-volatile memory and is a main storage device that stores programs desirable for the CPU 110 to execute various programs stored in the auxiliary storage device 150.

The RAM 130 is a volatile memory and is a main storage device that provides a work area in which various programs installed in the auxiliary storage device 150 are loaded when the CPU 110 executes various programs.

The I/F device 140 is a communication device for coupling to a network (not illustrated).

The auxiliary storage device 150 is an auxiliary storage device that stores various programs, information used when the CPU 110 executes various programs, information generated by the execution, and the like. As illustrated in FIG. 1, in a case of the information processing apparatus 100 according to the first embodiment, an optimization program 151, a program analysis conversion code 152, an original program 153, and a tuning program 154 are stored in the auxiliary storage device 150.

The optimization program 151 is executed by the CPU 110 to convert a part of the program codes of the target program (original program 153) to be optimized by using the program analysis conversion code 152, thereby generating the tuning program 154.

The operation device 160 is an input device used by a user of the information processing apparatus 100 to input various instructions to the information processing apparatus 100 when the optimization program 151 is executed by the CPU 110. The display device 170 is an output device for displaying an internal state of the information processing apparatus 100 when the optimization program 151 is executed by the CPU 110 to the user.

<Outline of Parallel Processing Using SIMD Operation Function>

Figure 2:
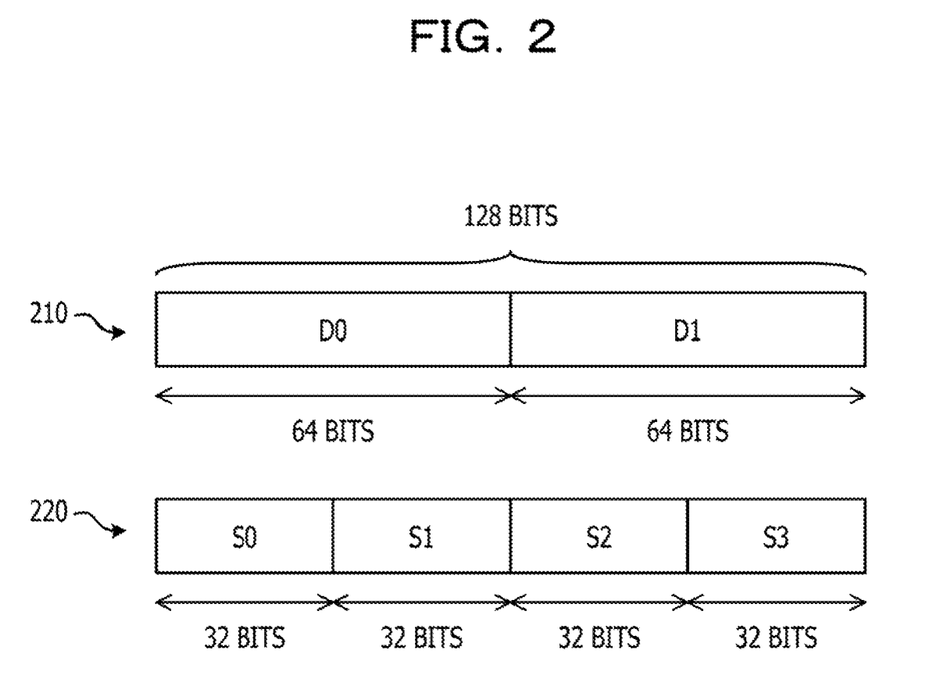
FIG. 2 is a diagram for explaining an outline of parallel processing using an SIMD operation function.

Next, an outline of parallel processing using the SIMD operation function of the CPU 110 will be described. FIG. 2 is a diagram for explaining an outline of parallel processing using the SIMD operation function. As illustrated in FIG. 2, when the CPU 110 of the information processing apparatus 100 has an SIMD operation function of 128 bits, in a double precision operation, data to be operated is executed in two parallels of 64 bits each (refer to reference numeral 210). On the other hand, in a single precision operation, the data to be operated is executed in four parallels of 32 bits each (refer to reference numeral 220).

As described above, in the SIMD operation function, the number of bits of data to be operated is reduced (execution accuracy is reduced (for example, from 64 bits to 32 bits)), and the number of parallel processing is increased (for example, from two parallel processing to four parallel processing), thereby increasing the number of processing executed by one instruction and reducing the operation time.

<Flow of Program Optimization Processing>

Figure 3:
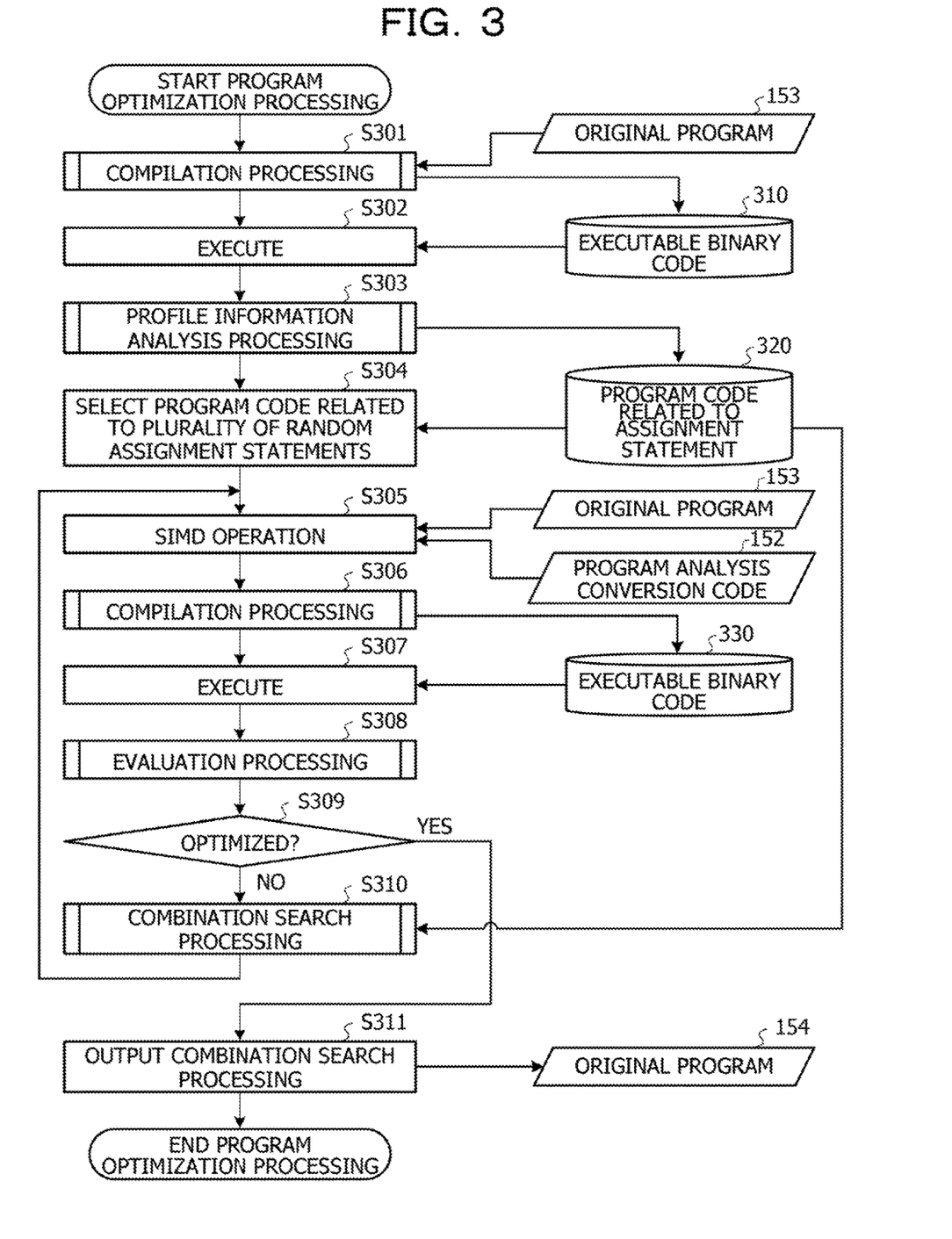
FIG. 3 is a flowchart illustrating a flow of program optimization processing.

Next, a flow of program optimization processing for optimizing a target program (original program 153) will be described. FIG. 3 is a flowchart illustrating a flow of program optimization processing. The CPU 110 executes the optimization program 151 to perform each processing included in the program optimization processing illustrated in FIG. 3.

In step S301, the CPU 110 executes the optimization program 151 to perform compilation processing. For example, the CPU 110 executes the optimization program 151 to read a target program (original program 153) to be optimized from the auxiliary storage device 150, and performs compilation processing on the read original program 153 (details will be described later). As a result, an executable binary code 310 is generated.

In step S302, the CPU 110 executes the optimization program 151 to execute the executable binary code 310. For example, the CPU 110 executes the optimization program 151 to perform processing of receiving an execution start instruction from a user, and when receiving the execution start instruction, executes the executable binary code 310 thereby generating profile information.

In step S303, the CPU 110 executes the optimization program 151 to perform profile information analysis processing. For example, the CPU 110 executes the optimization program 151 to acquire the profile information generated in step S302, thereby analyzing the acquired profile information. The profile information includes the number of executions of each program code of the original program 153, and the CPU 110 analyzes the profile information to extract a program code 320 related to an assignment statement having the higher number of executions.

In the first embodiment, the program code 320 related to the assignment statement having the higher number of executions is a "candidate" to be subjected to the parallel processing by the single precision operation using the SIMD operation function. In the first embodiment, the operation time is reduced by selecting an appropriate combination from the candidates.

In step S304, the CPU 110 executes the optimization program 151 to select a combination of the program codes related to a plurality of random assignment statements from the candidates.

In step S305, the CPU 110 executes the optimization program 151 to specify program codes related to the assignment statements included in the selected combination in the program codes included in the original program 153. The CPU 110 executes the optimization program 151 to convert the specified program code and generate the tuning program 154. As a result, the converted program codes in the generated tuning program 154 is subjected to the parallel processing by single precision operation using the SIMD operation function. The program analysis conversion code 152 is used for the conversion.

For example, for the program code related to the assignment statement specified in the original program 153, by using the program analysis conversion code 152, for example, the following processing is performed: processing of converting trigonometric function (sin, cos, and the like) for executing a double precision operation into trigonometric function for executing a single precision operation, processing of converting the definition of variables from the double precision operation to the single precision operation, and processing of converting numerical values from the double precision operation notation to the single precision operation notation.

With respect to the program code related to the assignment statement specified in the original program 153, processing of defining that it is a program code to which parallel processing is executed by a single precision operation using an SIMD operation function is performed.

It is noted that the processing of defining that it is a program code to which parallel processing is executed by the single precision operation using the SIND operation function is artificially performed (for example, it is assumed that it is defined by the user by explicitly describing "code.c"). However, when the compilation processing described later is performed, it may be automatically performed by, for example, determining and defining a program code to which the parallel processing is executed.

In step S306, the CPU 110 executes the optimization program 151 to perform compilation processing. For example, the CPU 110 executes the optimization program 151 to perform compilation processing on the tuning program 154 generated in step S305. As a result, the executable binary code 330 is generated.

In step S307, the CPU 110 executes the optimization program 151 to execute the executable binary code 330. For example, the CPU 110 executes the optimization program 151 to perform processing of receiving an execution start instruction from a user, and when receiving the execution start instruction, executes the executable binary code 330.

In step S308, the CPU 110 executes the optimization program 151 to perform evaluation processing. For example, the CPU 110 executes the optimization program 151 to calculate the execution performance (operation time) and the execution accuracy when the executable binary code 330 is executed (details will be described later).

In step S309, the CPU 110 executes the optimization program 151 to determine whether or not the calculated execution performance (operation time) and the execution accuracy satisfy a predetermined condition. When it is determined in step S309 that the calculated execution performance (operation time) and the execution accuracy do not satisfy the predetermined condition, it is determined that the target program (original program 153) is not optimized (NO is determined in step S309).

In step S310, the CPU 110 executes the optimization program 151 to perform combination search processing. For example, the CPU 110 executes the optimization program 151 to search for an appropriate combination (a combination in which the execution performance (operation time) and the execution accuracy satisfy a predetermined condition) from among the candidates.

When it is attempted to select all combinations of the program codes included in the candidates, the number of combinations to be selected becomes enormous. Therefore, in the first embodiment, an evolutionary computation is performed to reduce the number of searches for an appropriate combination in the program codes included in the candidates (details will be described later).

When a combination is selected in step S310 based on the evolutionary computation, the process returns to step S305. As a result, in step S305, among the program codes included in the original program 153, program codes related to the assignment statements included in the combination selected in step S310 is specified, and the conversion of the specified program codes is performed.

The combination search processing in step S310 is repeated until it is determined in step S309 that the calculated execution performance (operation time) and the execution accuracy satisfy the predetermined condition.

On the other hand, when it is determined in step S309 that the calculated execution performance (operation time) and the execution accuracy satisfy the predetermined condition, it is determined that the target program (original program 153) is optimized (YES is determined in step S309).

In step S311, the CPU 110 executes the optimization program 151 to output the tuning program 154, which is an optimized program.

<Details of Each Processing Included in Program Optimization Processing>

Next, the details of each processing (here, the compilation processing (step S301), the profile information analysis processing (step S303), the evaluation processing (step S308), and the combination search processing (step S310)) included in the program optimization processing (FIG. 3) will be described.

(1) Details of Compilation Processing

Figure 4:
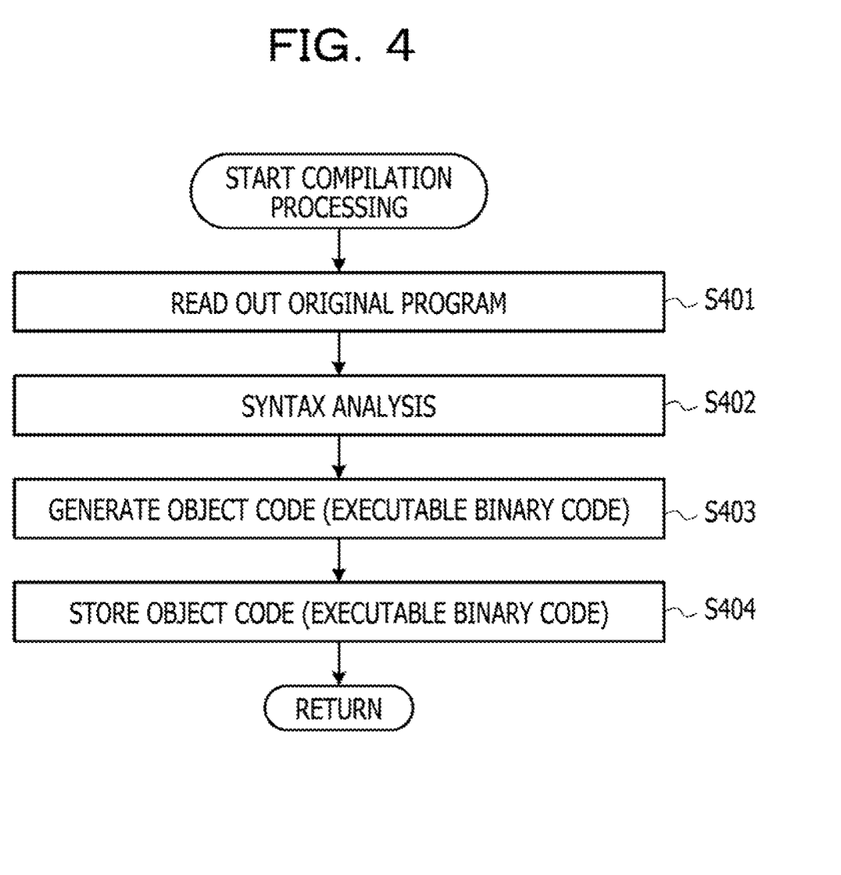
FIG. 4 is a flowchart illustrating a flow of compilation processing.

First, the compilation processing (step S301) will be described in detail. FIG. 4 is a flowchart illustrating a flow of the compilation processing.

In step S401, the CPU 110 executes the optimization program 151 to read the original program 153 from the auxiliary storage device 150.

In step S402, the CPU 110 executes the optimization program 151 to perform syntax analysis the read original program 153.

In step S403, the CPU 110 executes the optimization program 151 to generate an object code (executable binary code 310) based on the original program 153.

In step S404, the CPU 110 executes the optimization program 151 to store the executable binary code 310 in the auxiliary storage device 150, and the process returns to step S302 in FIG. 3.

(2) Details of Profile Information Analysis Processing

Next, the profile information analysis processing (step S303) will be described in detail.

(2-1) Flow of Profile Information Analysis Processing

Figure 5:
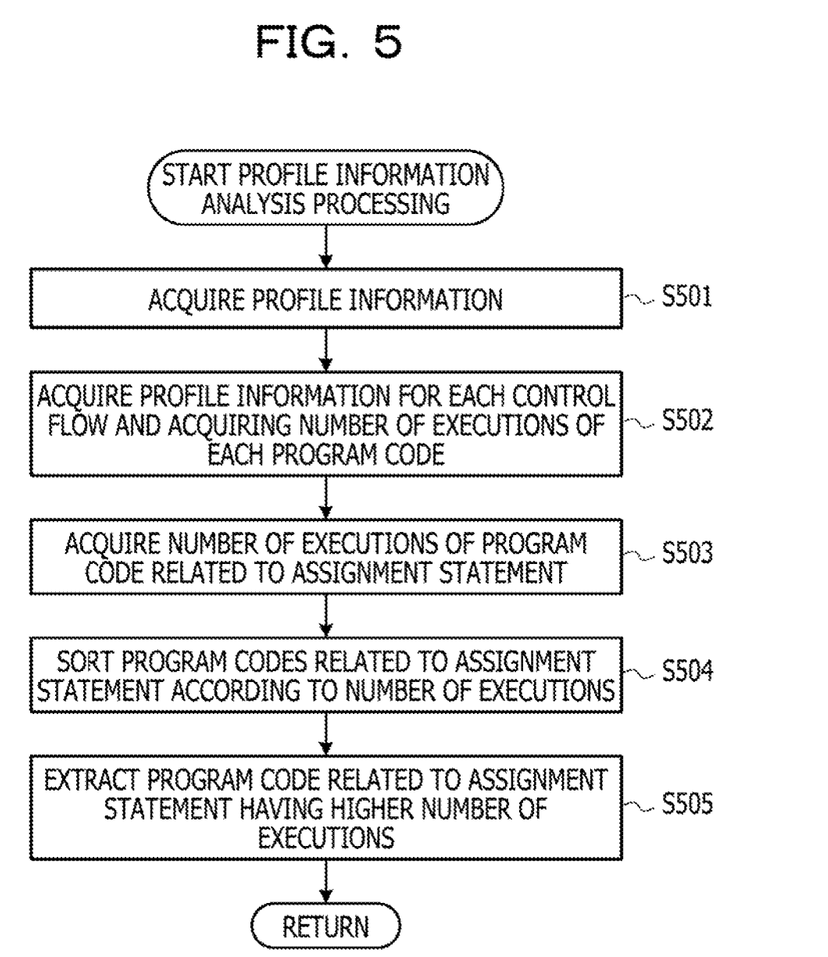
FIG. 5 is a flowchart illustrating a flow of profile information analysis processing.

First, the flow of the profile information analysis processing will be described. FIG. 5 is a flowchart illustrating the flow of the profile information analysis processing.

In step S501, the CPU 110 executes the optimization program 151 to acquire profile information.

In step S502, the CPU 110 executes the optimization program 151 to acquire profile information for each control flow and acquire the number of executions of each program code.

In step S503, the CPU 110 executes the optimization program 151 to acquire the number of executions of the program code related to the assignment statement from the acquired number of executions of each program code.

In step S504, the CPU 110 executes the optimization program 151 to sort the program codes related to the assignment statement according to the number of executions.

In step S505, the CPU 110 executes the optimization program 151 to extract, as a candidate, the program code 320 related to the assignment statement having the higher number of executions, and the process returns to step S304 in FIG. 3.

(2-2) Specific Example of Profile Information

Figure 6:
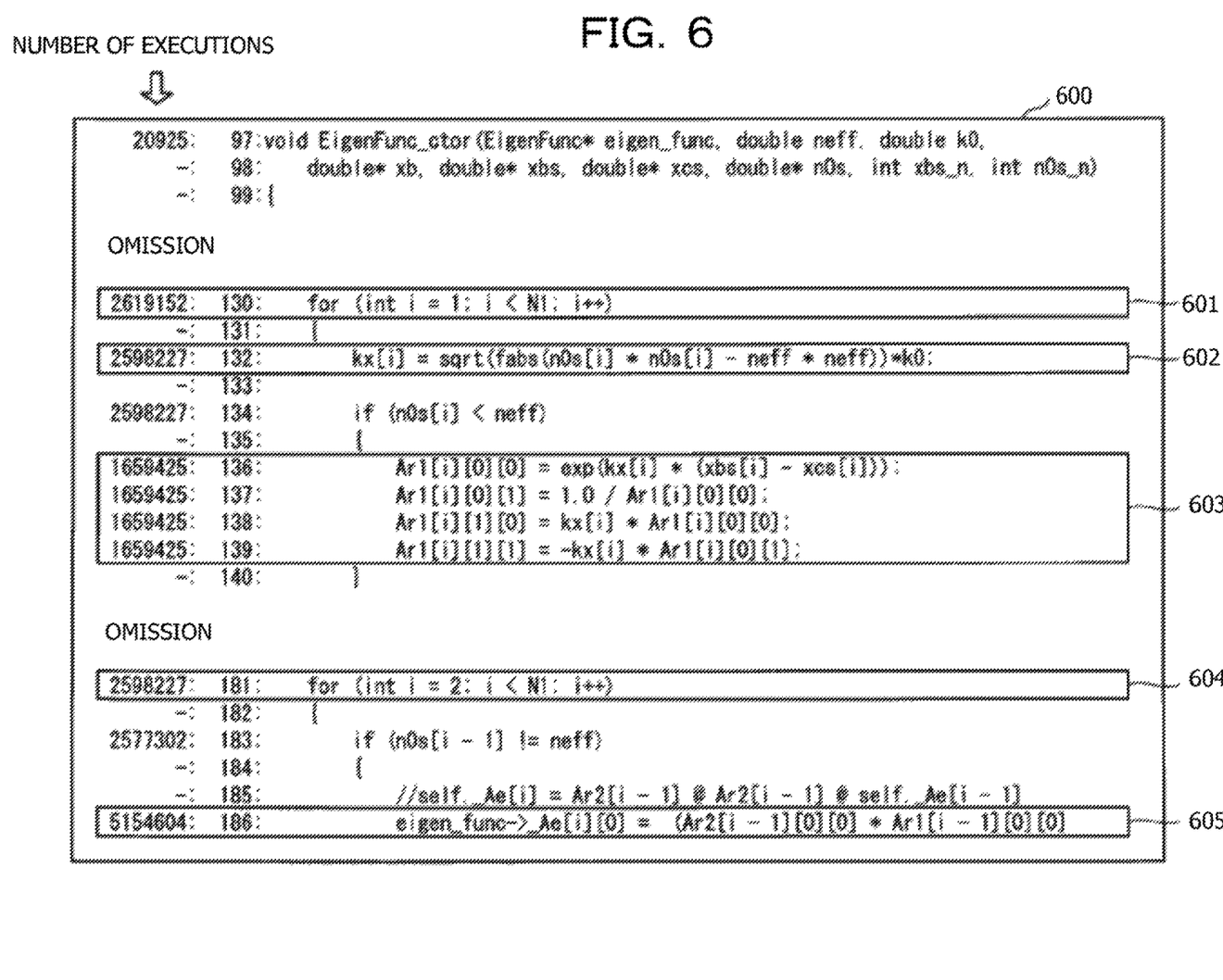
FIG. 6 is a diagram illustrating an example of profile information.

Next, a specific example of the profile information acquired in the profile information analysis processing (step S303) will be described. FIG. 6 is a diagram illustrating an example of the profile information.

As illustrated in FIG. 6, profile information 600 acquired in the profile information analysis processing includes the number of executions of each program code. The profile information 600 of FIG. 6 indicates that a program code 601 is executed 2619152 times by executing the executable binary code 310. Similarly, the profile information 600 of FIG. 6 indicates that a program code 602 is executed 2598227 times by executing the executable binary code 310.

The program codes 601 to 605 are program codes related to the assignment statements. Therefore, the assignment statement included in each of the program codes 601 to 605 is executed the number of times each of the program codes 601 to 605 is executed.

For example, the program code 601 includes "int i=1" and "i++" as the assignment statements. As described above, since the number of executions of the program code 601 is 2619152, the assignment statements of "int i=1" and "i++" are executed 2619152 times.

(2-3) Example of Candidate Extraction

Figure 7:
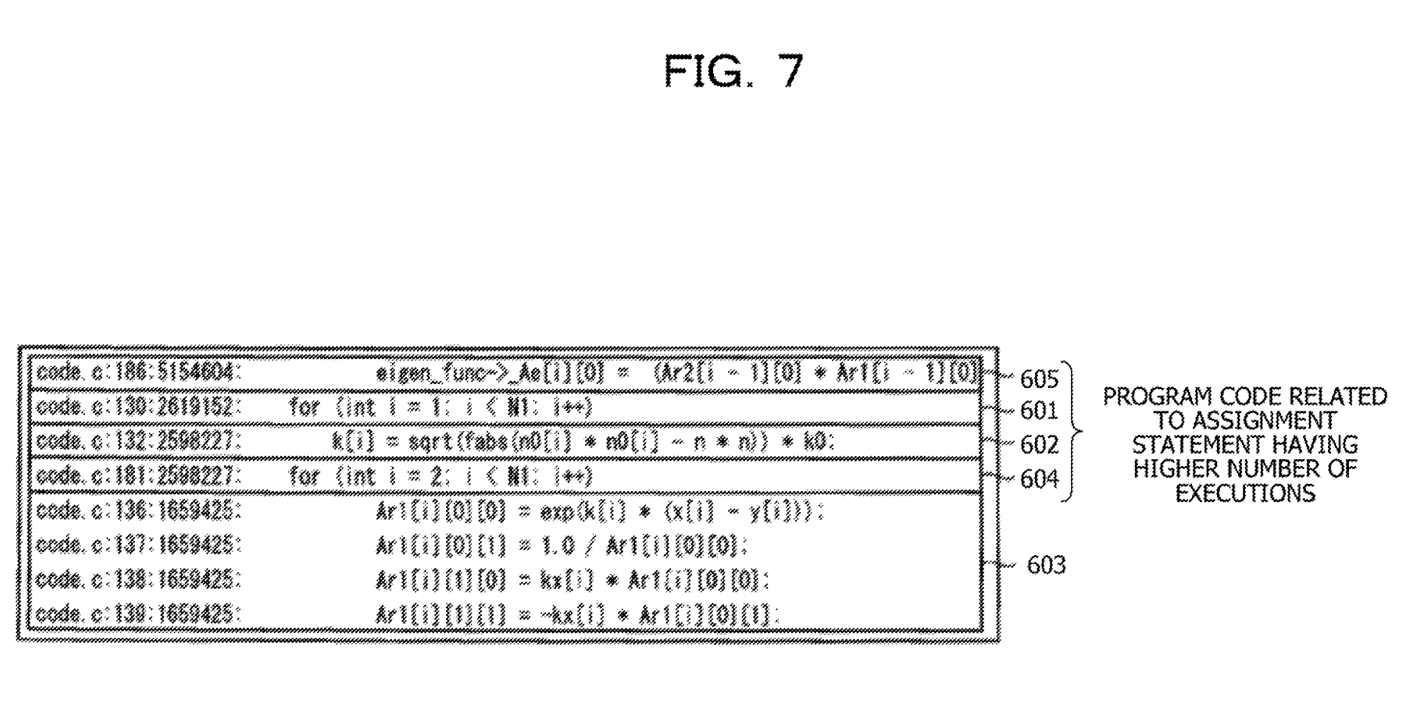
FIG. 7 is a diagram illustrating an example of candidate extraction.

Next, an example of candidate extraction will be described. FIG. 7 is a diagram illustrating an example of the candidate extraction. As illustrated in FIG. 7, the number of executions of each of the program codes 601 to 605, which are program codes related to assignment statements, is as follows: program code 601:2619152 times; program code 602:2598227 times; program code 603:1659425 times; program code 604:2598227 times; and program code 605: 5154604 times. Therefore, when the program codes are sorted in a descending order of the number of executions, the program codes are sorted in the order of 605→601→602→604→603.

In the example of FIG. 7, program codes 605, 601, 602, and 604 are extracted as the program code 320 related to the assignment statement having the higher number of executions.

(3) Details of Evaluation Processing

Figure 8:
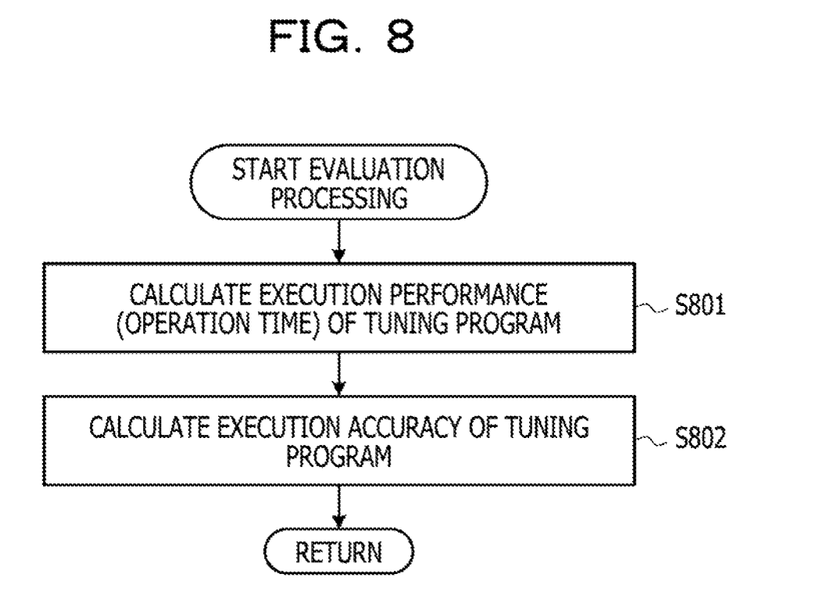
FIG. 8 is a flowchart illustrating a flow of evaluation processing.

Next, evaluation processing (step S308) will be described in detail. FIG. 8 is a flowchart illustrating a flow of evaluation processing.

In step S801, the CPU 110 executes the optimization program 151 to calculate the operation time as the execution performance when the executable binary code 330 is executed.

In step S802, the CPU 110 executes the optimization program 151 to acquire an execution result when the executable binary code 330 is executed. The CPU 110 executes the optimization program 151 to calculate the difference (execution accuracy) between the execution result when the executable binary code 310 is executed and the execution result when the executable binary code 330 is executed, and the process returns to step S309 in FIG. 3.

(4) Details of Combination Search Processing

Next, the combination search processing (step S310) will be described in detail.

(4-1) Flow of Combination Search Processing

Figure 9:
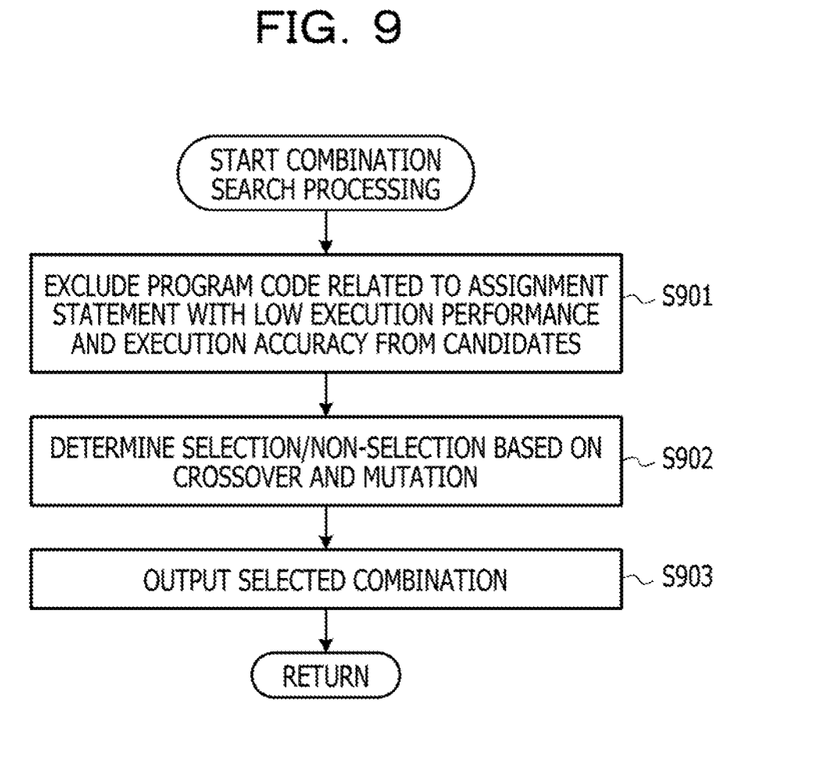
FIG. 9 is a flowchart illustrating a flow of combination search processing.

First, the flow of the combination search processing will be described. FIG. 9 is a flowchart illustrating a flow of the combination search processing.

In step S901, the CPU 110 executes the optimization program 151 to specify a program code related to an assignment statement with a low execution performance (long operation time) and low execution accuracy, based on the result of the evaluation processing (execution performance (operation time) and execution accuracy). The CPU 110 executes the optimization program 151 to exclude the program code related to the specified assignment statement from the candidates (the program code 320 related to the assignment statement having the higher number of executions).

In step S902, the CPU 110 executes the optimization program 151 to determine selection/non-selection based on crossover and mutation when selecting a program code related to the assignment statement from the current candidates.

In step S903, the CPU 110 executes the optimization program 151 to newly output a combination of program codes related to the selected assignment statement, and the process returns to step S305 in FIG. 3.

(4-2) Specific Example of Crossover and Mutation

Figure 10:
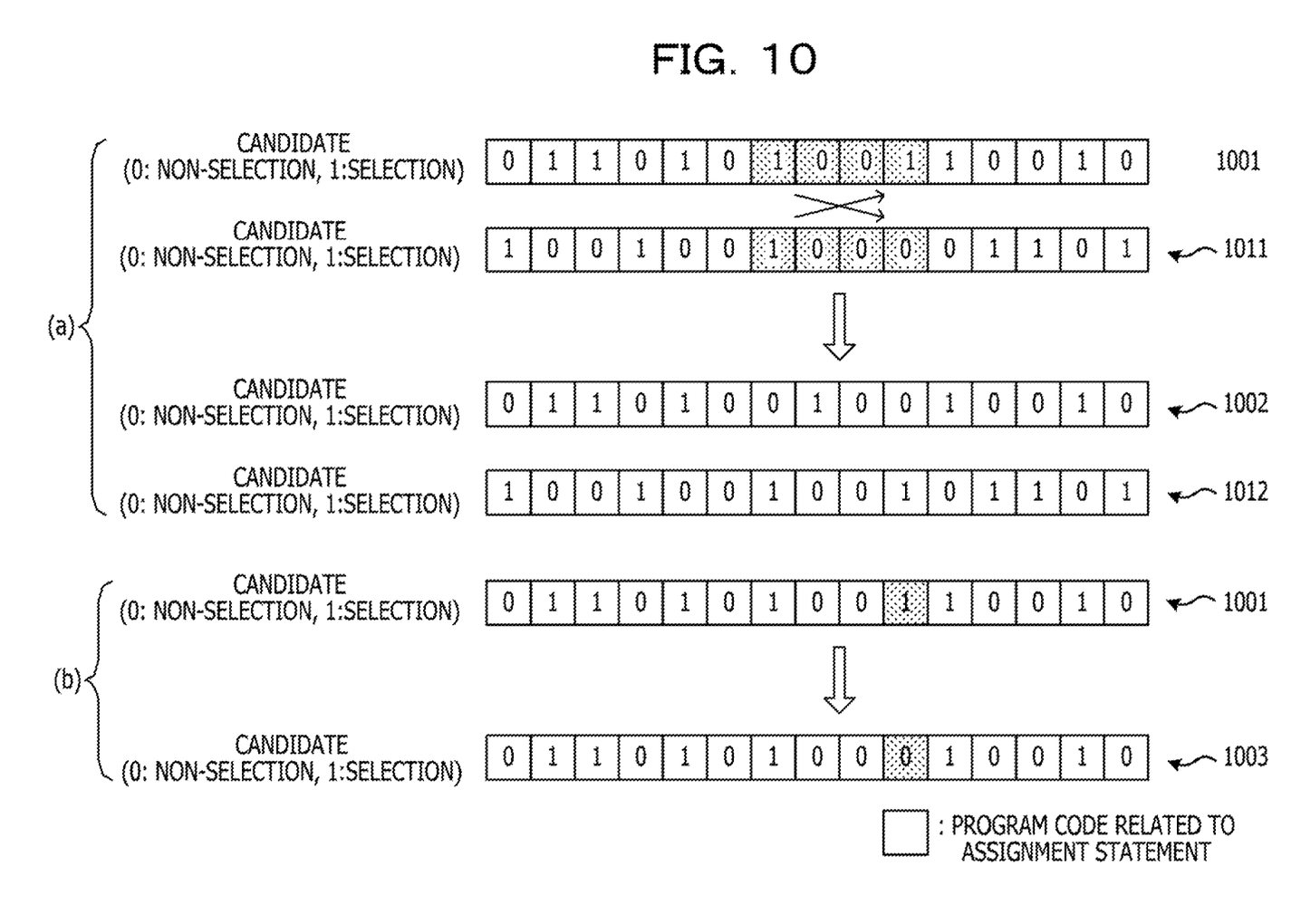
FIG. 10 is a diagram illustrating a specific example of selection/non-selection determination processing based on crossover and mutation.

Next, a specific example of selection/non-selection determination processing based on crossover and mutation will be described. FIG. 10 is a diagram illustrating a specific examples of selection/non-selection determination processing based on crossover and mutation. In FIG. 10, each rectangle represents a program code related to each assignment statement included in the candidate. A numerical value included in each rectangle represents whether or not a program code related to each assignment statement is selected. For example, "0" represents a non-selection, and "1" represents a selection.

In FIG. 10, in order to simplify the description, it is assumed that the candidates include program codes related to 15 assignment statements.

Among them, (a) of FIG. 10 illustrates a state in which the selection/non-selection of the program codes for the 15 assignment statements included in the candidates is determined based on the crossover.

A reference numeral 1001 indicates an example of a combination of the program codes related to seven assignment statements selected from the candidates. For example, in a case of the reference numeral 1001, a combination of the program codes related to the second, third, fifth, seventh, tenth, 11th, and 14th assignment statements is selected from the candidates.

On the other hand, a reference numeral 1011 indicates an example of a combination of the program codes related to six assignment statements selected from the candidates. For example, in a case of the reference numeral 1011, a combination of the program codes related to the first, fourth, seventh, 12th, 13th, and 15th assignment statements are selected from the candidates.

In the crossover processing, a new combination (reference numerals 1002 and 1012) is selected by partially changing the selection/non-selection of the combination indicated by reference numeral 1001 and partially changing the selection/non-selection of the combination indicated by reference numeral 1011.

On the other hand, (b) of FIG. 10 illustrates a state in which the selection/non-selection of the program codes for 15 assignment statements included in the candidates is determined based on mutation. As illustrated in (b) of FIG. 10, in the mutation processing, a new combination (reference numeral 1003) is selected by changing the selection to the non-selection (or non-selection to selection) for a part of the combination indicated by reference numeral 1001.

As is clear from the above description, in the information processing apparatus 100, the number of executions of each program code is acquired by executing the original program that is the target program to be optimized. In the information processing apparatus 100, a combination of program codes related to a plurality of assignment statements to be subjected to the single precision operation is selected from among the program codes related to assignment statements having higher number of executions.

The generated tuning program is executed and the execution accuracy and the operation time are calculated in the information processing apparatus 100, when the original program is converted so that the parallel processing using the SIMD operation function is executed for the selected combination.

Further, in the information processing apparatus 100, a combination is searched for so that the calculated execution accuracy and operation time satisfy a predetermined condition.

Thus, according to the information processing apparatus 100, it is possible to appropriately select a target for which the execution accuracy is to be reduced in the parallel processing using the SIMD operation function.

Second Embodiment

In the first embodiment, the details of the extraction method for extracting the program code 320 related to the assignment statement having the higher number of executions are not described, but an optional extraction method may be applied to the extraction method. For example, the program codes related to the assignment statements, having the top N (or top M %) number of executions may be extracted, or the program codes related to the assignment statements having the execution numbers equal to or greater than a predetermined threshold may be extracted.

The disclosed technique may have a form stated in the following appendixes.

(Appendix 1)

An information processing method executed by a computer, the method including: executing a target program to acquire the number of executions of each program code;

selecting a combination of program codes related to a plurality of assignment statements from among program codes related to assignment statements having a higher number of executions;

executing a changed target program when the target program is changed to calculate an execution accuracy and an operation time so that parallel processing using an SIMD operation function is executed for each of the program codes related to the plurality of assignment statements included in the selected combination; and searching for the combination so that the calculated execution accuracy and operation time satisfy a predetermined condition.

(Appendix 2)

The information processing method according to appendix 1, in which the combination is searched for by performing an evolutionary computation on the program codes related to the assignment statements having the higher number of executions.

(Appendix 3)

The information processing method according to appendix 2, in which when a first combination of program codes related to a plurality of assignment statements is selected from among the program codes related to assignment statements having the higher number of executions and a second combination of the program codes related to the plurality of assignment statements is selected from among the program codes related to the assignment statements having the higher number of executions, the combination is newly selected by crossing over the first combination and the second combination.

(Appendix 4)

The information processing method according to appendix 2, in which a combination is newly selected by changing a part of the combination from selection to non-selection, or changing a part of the combination from non-selection to selection, when the combination of program codes related to a plurality of assignment statements is selected from among the program codes related to the assignment statements having the higher number of executions.

(Appendix 5)

The information processing method according to appendix 1, in which a program code related to an assignment statement with a low execution accuracy and a long operation time among the program codes related to the assignment statements having the higher number of executions is excluded from the program codes related to the assignment statements having the higher number of executions.

(Appendix 6)

An optimization program for causing a computer to execute a process, the process including: executing a target program to acquire the number of executions of each program code;

selecting a combination of program codes related to a plurality of assignment statements from among program codes related to assignment statements having a higher number of executions;

executing a changed target program when the target program is changed to calculate an execution accuracy and an operation time so that parallel processing using an SIMS operation function is executed for each of the program codes related to the plurality of assignment statements included in the selected combination; and searching for the combination so that the calculated execution accuracy and operation time satisfy a predetermined condition.

The above-described embodiment is not limited to the configurations illustrated herein, such as the combination of the configurations described in the above embodiment with other elements. These configurations may be modified without departing from the gist of the embodiment and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method executed by a computer, the method comprising executing a target program to acquire number of executions for ach of a plurality of program codes;

selecting a combination of program codes related to a plurality of assignment statements from among program codes related to assignment statements having a higher number of executions based on the acquired number of executions;

when the target program is changed, executing the changed target program to calculate an execution accuracy and an operation time so that parallel processing using an SIMD operation function is executed for each of the program codes related to the plurality of assignment statements included in the selected combination; and searching for the combination so that the calculated execution accuracy and operation time satisfy a predetermined condition.

2. The information processing method according to claim 1, the method further comprising searching the combination for by performing an evolutionary computation on the program codes related to the assignment statements having the higher number of executions.

3. The information processing method according to claim 2, the method further comprising searching the combination newly by crossing over the first combination and the second combination, when a first combination of the program codes related to the plurality of assignment statements is selected from among the program codes related to the assignment statements having the higher number of executions and a second combination of the program codes related to the plurality of assignment statements is selected from among the program codes related to the assignment statements having the higher number of executions.

4. The information processing method according to claim 2, the method further comprising selecting the combination newly by changing a part of the combination from selection to non-selection, or changing a part of the combination from non-selection to selection, when the combination of the program codes related to the plurality of assignment statements is selected from among the program codes related to the assignment statements having the higher number of executions.

5. The information processing method according to claim 1,
wherein a program code related to an assignment statement with a low execution accuracy and a long operation time among the program codes related to the assignment statements having the higher number of executions is excluded from the program codes related to the assignment statements having the higher number of executions.

6. A non-transitory computer-readable storage medium storing a program that causes a computer to execute a process, the process comprising:
  executing a target program to acquire number of executions for each of a plurality of program codes;
  selecting a combination of program codes related to a plurality of assignment statements from among program codes related to assignment statements having a higher number of executions based on the acquired number of executions;
  when the target program is changed, executing the changed target program to calculate an execution accuracy and an operation time so that parallel processing using an SIMD operation function is executed for each of the program codes related to the plurality assignment statements included in the selected combination; and
  searching for the combination so that the calculated execution accuracy and operation time satisfy a predetermined condition.

7. the non-transitory computer-readable storage medium according to claim 6, the process further comprising searching the combination for by performing an evolutionary computation on the program codes related to the assignment statements having the higher number of executions.

8. the non-transitory computer-readable storage medium according to claim 7, the process further comprising searching the combination newly by crossing over the first combination and the second combination, when a first combination of the program codes related to the plurality of assignment statements is selected from among the program codes related to the assignment statements having the higher number of executions and a second combination of the program codes related to the plurality of assignment statements is selected from among the program codes related to the assignment statements having the higher number of executions.

9. the non-transitory computer-readable storage medium according to claim 7, the process further comprising selecting the combination newly by changing a part of the combination from selection to non-selection, or changing a part of the combination from non-selection to selection, when the combination of the program codes related to the plurality of assignment statements is selected from among the program codes related to the assignment statements having the higher number of executions.

10. the non-transitory computer-readable storage medium according to claim 9, wherein a program code related to an assignment statement with a low execution accuracy and a long operation time among the program codes related to the assignment statements having the higher number of executions is excluded from the program codes related to the assignment statements having the higher number of executions.

* * * * *